US011084637B1

(12) United States Patent
Hoffman (10) Patent No.: US 11,084,637 B1
(45) Date of Patent: Aug. 10, 2021

(54) CUSHIONED PACKAGING MATERIALS, CUSHIONED PACKAGES, AND RELATED METHODS

(71) Applicant: Amazon Technologies, Inc., Seattle, WA (US)

(72) Inventor: Brian Hoffman, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/147,160

(22) Filed: Sep. 28, 2018

(51) Int. Cl.
| *B65D 65/40* | (2006.01) |
| *B65D 81/03* | (2006.01) |
| *B32B 27/32* | (2006.01) |
| *B32B 7/12* | (2006.01) |
| *B32B 3/12* | (2006.01) |
| *B65B 5/02* | (2006.01) |
| *B32B 27/10* | (2006.01) |

(52) U.S. Cl.
CPC .............. *B65D 65/406* (2013.01); *B32B 3/12* (2013.01); *B32B 7/12* (2013.01); *B32B 27/10* (2013.01); *B32B 27/32* (2013.01); *B65B 5/02* (2013.01); *B65D 81/03* (2013.01); *B32B 2250/04* (2013.01); *B32B 2307/7265* (2013.01); *B32B 2439/40* (2013.01); *B32B 2553/02* (2013.01)

(58) Field of Classification Search
CPC .... B65D 81/03; B65D 65/406; B65D 81/022; B32B 3/12; B32B 7/12; B32B 27/10; B32B 27/32; B32B 1/02; B32B 5/028; B65B 5/02; B65B 55/20; B31B 2155/00; B31B 2170/20; B31B 70/00; B29L 2009/00; B31F 1/0009

USPC .................. 229/68.1, 164.1, 307, 309, 87.02; 206/521; 493/904, 922
See application file for complete search history.

(56) References Cited

U.S. PATENT DOCUMENTS

| 2,962,158 A | 11/1960 | Struthers |
| 3,303,629 A | 2/1967 | Tobin |

(Continued)

FOREIGN PATENT DOCUMENTS

| JP | 01-294465 A | 11/1989 |
| WO | WO 1997/003816 A1 | 2/1997 |
| WO | WO 2000/005149 A2 | 2/2000 |

OTHER PUBLICATIONS

U.S. Appl. No. 15/720,538, filed Sep. 29, 2017, Hoffman et al.

(Continued)

*Primary Examiner* — Christopher R Demeree
(74) *Attorney, Agent, or Firm* — BakerHostetler (57) ABSTRACT

A laminate includes an outer liner having a resin layer disposed on a paper sheet. The resin layer extends between first and second opposed lateral edges of the sheet and defines a moisture barrier. A cushion layer is disposed over the resin layer. An inner liner of kraft paper is disposed over the cushion layer. A region of the resin layer is activated into an adhesive bonding the cushion layer and inner liner to the sheet. The laminate defines first and second longitudinally adjacent portions. The outer liner in the first portion has opposed first and second peripheral portions extending laterally outward from opposed lateral edges of the cushion layer and inner liner to the first and second lateral edges of the sheet, whereby a first width between the lateral edges along the first portion exceeds a second width measured the lateral edges along the second portion.

20 Claims, 5 Drawing Sheets

(56) References Cited

U.S. PATENT DOCUMENTS

| | | | |
|---|---|---|---|
| 3,762,629 A | 10/1973 | Bruno | |
| 3,867,874 A * | 2/1975 | O'Neil | B31B 70/00 |
| | | | 493/217 |
| 3,906,128 A * | 9/1975 | Burling | B32B 27/00 |
| | | | 428/86 |
| 4,011,798 A * | 3/1977 | Bambara | B29C 65/18 |
| | | | 493/240 |
| 4,087,002 A * | 5/1978 | Bambara | B29C 65/18 |
| | | | 206/523 |
| 4,105,724 A | 8/1978 | Talbot | |
| 4,253,892 A * | 3/1981 | D'Angelo | B29C 65/02 |
| | | | 156/84 |
| 4,265,956 A | 5/1981 | Colijn | |
| 4,297,154 A | 10/1981 | Keller | |
| 4,832,228 A | 5/1989 | Hickey | |
| 4,921,118 A | 5/1990 | Gass | |
| 5,030,501 A | 7/1991 | Colvin et al. | |
| 5,207,020 A | 5/1993 | Aslam et al. | |
| 5,503,328 A | 4/1996 | Roccaforte et al. | |
| 5,651,402 A | 7/1997 | McCaul | |
| 5,667,871 A | 9/1997 | Goodrich et al. | |
| 6,089,325 A | 7/2000 | Yassin Alhamad | |
| 6,800,162 B2 | 10/2004 | Kannankeril et al. | |
| 6,898,922 B2 | 5/2005 | Reist | |
| 7,128,211 B2 | 10/2006 | Nishi et al. | |
| 7,200,974 B2 | 4/2007 | Higer et al. | |
| 7,220,476 B2 | 5/2007 | Sperry et al. | |
| 7,223,461 B2 | 5/2007 | Kannankeril et al. | |
| 7,240,468 B2 | 7/2007 | Tanaka et al. | |
| 7,658,543 B2 * | 2/2010 | Shiokawa | B32B 27/08 |
| | | | 383/107 |
| 8,919,689 B2 | 12/2014 | Kuchar et al. | |
| 9,266,300 B2 | 2/2016 | Chuba et al. | |
| 9,315,319 B2 | 4/2016 | Maxwell et al. | |
| 9,586,747 B2 | 3/2017 | Zhang | |
| 9,649,823 B2 | 5/2017 | Prud'homme et al. | |
| 9,827,711 B2 * | 11/2017 | Wetsch | B32B 3/04 |
| 9,969,136 B2 | 5/2018 | Lepine et al. | |
| 10,002,692 B2 | 6/2018 | Czyzewski et al. | |
| 10,301,121 B1 | 5/2019 | Hoffman et al. | |
| 10,647,460 B2 | 5/2020 | Wehrmann | |
| 2004/0000581 A1 * | 1/2004 | Brandolini | B32B 27/08 |
| | | | 229/68.1 |
| 2008/0020188 A1 | 1/2008 | Gale | |
| 2014/0130461 A1 | 5/2014 | Johan | |
| 2015/0314936 A1 | 11/2015 | Stack, Jr. | |
| 2016/0067938 A1 | 3/2016 | Goodrich | |
| 2017/0203866 A1 | 7/2017 | Goodrich | |
| 2018/0370702 A1 | 12/2018 | Goodrich | |
| 2019/0100369 A1 * | 4/2019 | Hoffman | B65D 65/406 |

OTHER PUBLICATIONS

U.S. Appl. No. 15/891,600, filed Feb. 8, 2018, Talda et al.
U.S. Appl. No. 16/147,073, filed Sep. 28, 2018, Hoffman.
U.S. Appl. No. 15/655,318, filed Jul. 20, 2017, Hoffman et al.
International Patent Application No. PCT/US2018/053372; Int'l Search Report and the Written Opinion; dated Nov. 30, 2018; 13 pages.

* cited by examiner

CUSHIONED PACKAGING MATERIALS, CUSHIONED PACKAGES, AND RELATED METHODS

BACKGROUND

Many common packaging products, such as, for example, padded envelopes (e.g, "bubble mailers"), are made from a combination of paper-based materials and plastic-based materials bonded together. While the paper-based materials of the packaging product may be recyclable in a paper-based recycling facility and the plastic-based materials may be recyclable in a plastic-based recycling facility, such products need to be separated into their paper-based and plastic-based materials prior to depositing them into a recycling bin. Thus, such products, as received by a consumer or other recipient, are not considered 100 percent "curbside recyclable." Unfortunately, such packaging products often find their way into landfills or other garbage disposal sites.

Paper-based packages, particularly curbside recyclable paper-based packages, can also be problematic if exposed to liquid or moisture. For example, a mailer formed of kraft paper, without any type of moisture barrier, can risk damage to its contents if the mailer is exposed to liquid or moisture. Yet, the inclusion of a polymeric moisture barrier can render the package unfit for curbside recycling. Additionally, paper-based mailers are typically more susceptible to tearing and/or cracking than plastic-based mailers. In particular, plastic-based mailers are able to absorb energy by "blunting" the tip of the crack or tear as long-chain molecules wrap around the tip of a tear and absorb the propagation energy thereof via plastic deformation. Paper-based mailers typically lack the ability to absorb energy via plastic deformation, particularly without employing polymeric materials that could forfeit the curbside recyclability of the mailer.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings.

DETAILED DESCRIPTION

The embodiments of the present disclosure pertain to paper-based, cushioned packaging laminates that include bonding materials that can be selectively activated to become adhesive, which bonding materials also provide a moisture barrier, and further provide increased sealing strength at the seams of a package formed by the laminate.

Figure 1:
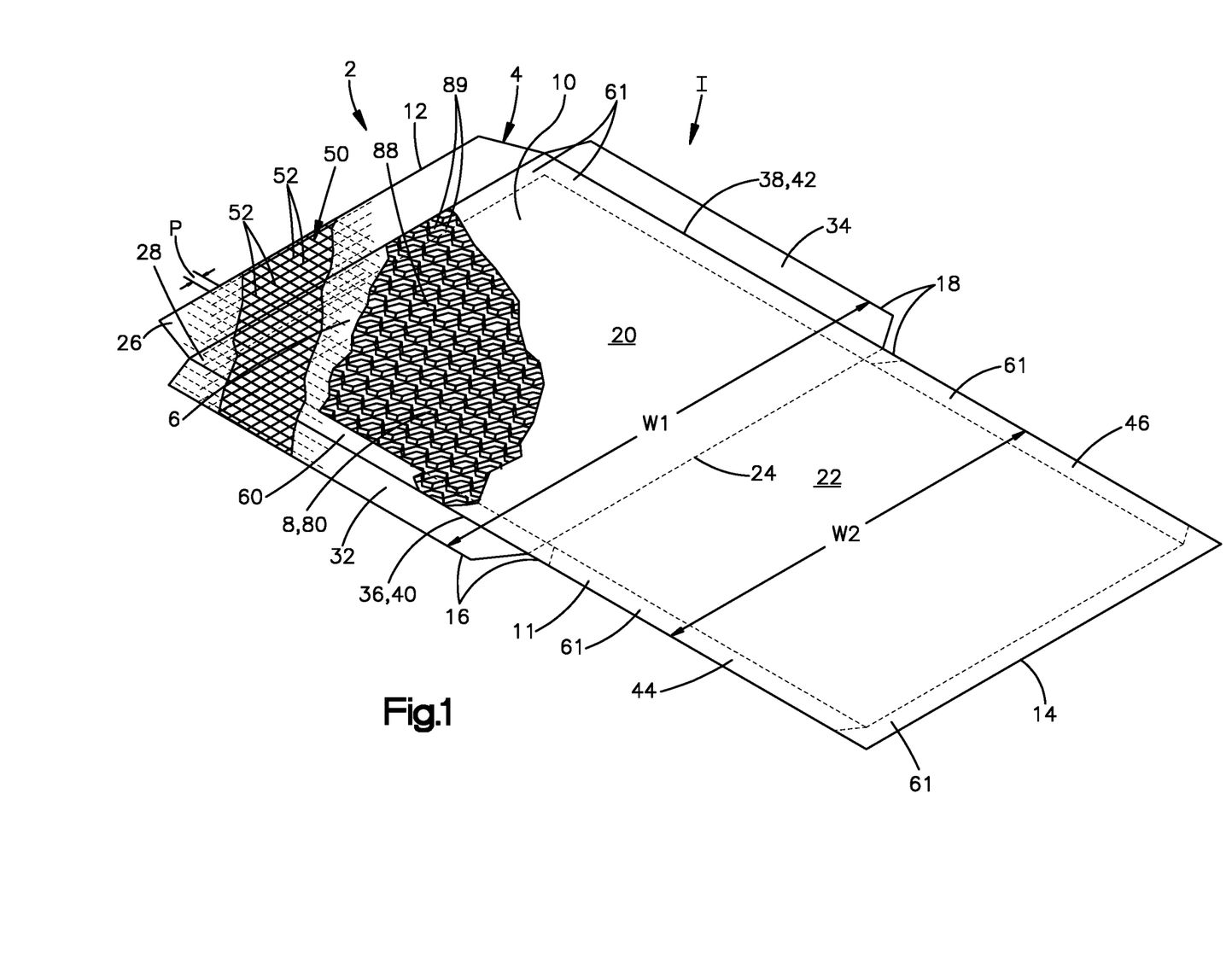
FIG. 1 shows a perspective view of a packaging laminate in an initial, flat configuration, wherein the laminate has a cushion layer and is configured to be folded into a padded package, according to an embodiment of the present disclosure.
Figure 2:
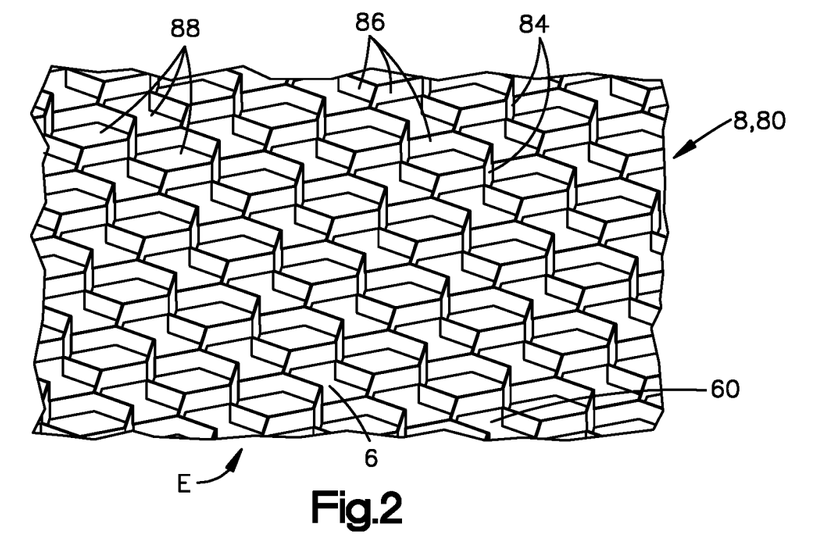
FIG. 2 shows an enlarged view of a portion of the cushion layer illustrated in FIG. 1.

Referring now to FIGS. 1 and 2, a package 2 according to an embodiment of the present disclosure includes a cushioned laminate 4 composed of a plurality of layers of packaging material, including a first or outer liner 6, a cushion layer 8 disposed over the outer liner 6, and a second or inner liner 10 disposed over the cushion layer 8. In an initial, flat, or unfolded configuration I, the laminate 4 defines a first end 12 and an opposed second end 14 spaced from each other along a first or longitudinal direction X. The first end 12 can define a closure flap 13 for closing and sealing an induction opening of the package 2. The laminate 4 also defines a first lateral edge 16 and a second lateral edge 18 spaced from each other along a second or lateral direction Y when the laminate 4 is in the initial configuration I. The outer and inner liners 6, 10 are spaced from each other along a transverse direction T when the laminate 4 is in the initial configuration I. The lateral direction Y is offset from the longitudinal direction X, while the transverse direction T is substantially perpendicular to at least one of the longitudinal and lateral directions X, Y. In the illustrated embodiment, the longitudinal and lateral directions X, Y are substantially perpendicular to each other, although it is to be appreciated that in other embodiments the longitudinal and lateral direction X, Y can be oriented at an oblique angle with respect to each other.

The laminate 4 includes a first portion 20 and a second portion 22 spaced from each other along the longitudinal direction X. The first and second portions 20, 22 can each extend to a common boundary 24 therebetween; however, in other embodiments, one or more intermediate portions can be positioned between the first and second portions 20, 22. The laminate 4 is configured so that at least one of the first and second portions 20, 22 can be folded relative to the other about the boundary 24, preferably so that first and second portions 22, 24 are doubled over one another in a first folded configuration F1, whereby the inner liner 10 substantially defines an interior volume of the package 2. When the first and second portions 20, 22 are doubled over one another about the boundary 24, the boundary 24 can define a folded end 25 of the package 2. Additionally, when the first and second portions 20, 22 are doubled over one another, the first and second lateral edges 16, 18 along the second laminate portion 22 can generally define opposed lateral edges 17, 19 of the package 2.

The outer liner 6 includes a sheet 26 of paper having a first or inner surface 28 and a second or outer surface 30 opposite the inner surface 28. The sheet 26 can be said to define the first and second ends 12, 14 and the first and second lateral edges 16, 18 of the laminate 4. When the first and second laminate portions 20, 22 are doubled over one another, the outer surface 30 of the sheet 26 defines an exterior of the package 2. The paper of the sheet 26 is a packaging paper, preferably kraft paper, and more preferably extensible kraft paper, which provides a measure of flexibility greater than that of other types of kraft paper. Such flexibility provides greater resistance to the formation of punctures, tears, and cracks. The sheet 26 has a lateral width that is wider in the first laminate portion 20 than it is in the second laminate portion 22. For example, the sheet 26 defines a first width W1 measured along the lateral direction Y between the first and second lateral edges 16, 18 in the first laminate portion 20, and the sheet 26 defines a second width W2 measured along the lateral direction Y between the first and second lateral edges 16, 18 in the second laminate portion 22.

Moreover, the outer liner 6 in the first laminate portion 20 has opposed first and second peripheral portions 32, 34 that extend laterally beyond (i.e., outward from) lateral edges 36, 38 of the cushion layer 8 and lateral edges 40, 42 of the inner liner 10 to the lateral edges 16, 18 of the first laminate portion 20. The outer liner 6 in the second laminate portion 22 defines third and fourth peripheral portions 44, 46 that extend laterally inward from the first and second lateral edges 16, 18 of the second laminate portion 22 and preferably laterally inward from the respective lateral edges 36, 38, 40, 42 of the cushion layer 8 and the inner liner 10. The first and second peripheral portions 32, 34 are configured to be folded over the third and fourth peripheral portions 44, 46, respectively, so as to seal the lateral sides 17, 19 of the package 2, as described in more detail below. Thus, the first and second peripheral portions 32, 34 can also be referred to as "fold-over portions" or "flaps." It is to be appreciated that the lateral edges 36, 38 of the cushion layer 8 and the lateral edges 40, 42 of the inner liner 10 can be substantially aligned with each other, respectively, although in other embodiments the lateral edges 36, 38 and lateral edges 40, 42 can be offset from each other, respectively.

The outer liner 6 can include a support structure attached thereto for providing enhanced resistance to failure of the package 2, including failure of the sheet 26, particularly modes of failure involving tearing or cracking. The support structure can include a mesh of filaments 50 (also referred to herein as a "filament mesh"), which can include a first plurality of filaments 50a extending perpendicular to a second plurality of filaments 50b so as to be arranged in a grid or a grid-like pattern. Such filament meshes 50 can also be referred to as a "scrim". It is to be appreciated, however, that the filament mesh 50 can comprise other filament patterns. The filament mesh 50 is configured such that, when bonded to the sheet 26, the filaments 52 of the mesh 50 impede or arrest the propagation of cracks or tears along the sheet 26. In particular, as a crack or tear propagates to one of the filaments 52, the filaments 52 absorb the load of the crack or tear propagation and distribute the load over a greater area, which has been observed to stop the propagation considerably sooner than when a mesh 50 is not present. In other words, a considerably greater crack or tear propagation load is necessary to cause the outer liner 6 to fail via cracking or tearing than a similarly configured outer liner lacking the mesh 50. In one non-limiting example embodiment, the mesh 50 can comprise fiberglass filaments 52 arranged perpendicularly in a grid defining a pitch P of about 0.5 inch, wherein the pitch P is defined as the distance between adjacent, perpendicular filaments 52. Other filament 52 materials and pitches P are within the scope of the present disclosure. It is to be appreciated that meshes 50 employing smaller pitches P (i.e., more filaments) provide enhanced arresting of crack or tear propagation, although such meshes 50 also increase the weight of the package. The mesh 50 can be selected based on the pitch P and weight as needed for particular packaging tasks.

The filament mesh 50 is bonded to the sheet 26, preferably with a multi-purpose layer 60 of material, which preferably provides a moisture barrier and at least one mode of adhesion, such as adhesion via laminating the filament mesh 50 to inner surface 28 of the sheet 26. The layer 60 is also preferably a type that is configured to be activated into an adhesive that bonds with the inner liner 10 when exposed to a catalyst. Thus, the layer 60 can be referred to as an "adhesive layer" or a "bonding layer." Preferably, the filament mesh 50 and the bonding layer 60 extend across an entirety of the inner surface 28 of the sheet 26. Alternatively, one or both of the filament mesh 50 and the bonding layer 60 can extend across less than an entirety of the inner surface 28. In such embodiments, the outer liner 6 can optionally include a plurality of separate filament meshes 50, as well as a plurality of separate bonding layers 60, disposed over various regions of the first surface 28 as needed. The catalyst can include, by way of non-limiting example, electromagnetic radiation, thermal radiation (i.e., heat), pressure, friction, vibration, or any combination of the foregoing, such as a combination of heat and pressure, or friction welding, for example. When the catalyst includes heat, the bonds formed along the activated regions can be referred to as "heat seals." The bonding layer 60 can comprise a thermoplastic material (such as low density polyethylene (LDPE), high density polyethylene (HDPE), or an LDPE/HDPE blend, for example) laminating the filament mesh 50 to inner surface 28 of the sheet 26.

The bonding layer 60 is preferably also configured so that the packages 2 formed according to the present disclosure can be paper curbside recyclable (i.e., the entire package 2 that employs the bonding layer 60 is capable of being recycled in a paper recycling facility and/or in a paper recycling process available to the public through most municipal recycling programs). For example, the thermoplastic can be utilized in a sufficiently low volume and the thermoplastic resin can be modified, such as with additives, such as mineral additives, for example, so that as the laminate 4 is processed in a paper repulping process, the thermoplastic constituents of the bonding layer 60 breakdown sufficiently to be processed out of the paper. In a preferred embodiment, the bonding layer 60 comprises a mineral-polyolefin blended resin well-suited for paper recycling when bonded to standard paper mailers, such as a resin having a blend of 40% calcium carbonate (CaCO2) and 60% polyolefin (e.g., polypropylene, LDPE, or LDPE/HPPE), such as any EarthCoating® resins produced by Smart Planet Technologies, Inc., based in Irvine, Calif. When the bonding layer 60 comprises an EarthCoating® resin, the layer 60 can be extrusion-coated over the sheet 26 (thus bonding, such as by laminating, itself to the sheet 26) at high speeds, including commercial lines speeds. In some embodiments, the bonding layer 60 can optionally consist substantially entirely of a mineral-polyolefin blended resin. It is to be appreciated that the foregoing mineral-polyolefin resins are not only well-adapted to have their plastic constituents be processed out in a paper recycling process (rendering the laminate 4 that employs such resins paper curbside recyclable, at least such laminates 4 with sizes and thicknesses adapted for standard-sized packages, including mailers), but they also comprise a moisture barrier and provide at least two modes of adhesion: the first mode via extrusion-coating and the second mode via thermal activation (i.e., exposure to heat and pressure); furthermore, the second mode (i.e., heat and pressure) allows discrete, select regions of the bonding layer 60 and up to an entirety of the bonding layer 60 to be activated so as to bond with the inner liner 10. When the bonding layer 60 comprises a mineral-polyolefin blended resin, the terms "bonding layer" and "resin layer" can be used interchangeably.

It is to be appreciated that a thermoplastic bonding layer 60 can also provide a moisture barrier, a first mode of adhesion (i.e., lamination) that bonds itself and the filament mesh 50 to the sheet 26, a second mode of adhesion (i.e., thermal activation, including thermal activation of discrete, selective portions of the thermoplastic bonding layer 60 and up to an entirety of the thermoplastic bonding layer 60) that bonds the thermoplastic bonding layer 60 to the inner liner 10, and paper curbside recyclability. When the bonding layer 60 comprises a thermoplastic, the terms "bonding layer" and "thermoplastic layer" can be used interchangeably. It is also to be appreciated that the outer liner 6 can optionally comprise two or more layers 60 of material, whereby at least one of the layers 60 has a different composition that at least one other layer 60. In such multi-layer embodiments, each layer 60 can be selected for providing one or more of the foregoing functions (e.g., bonding itself and the filament mesh 50 to the sheet 26, bonding with the inner liner 10, and providing a moisture barrier).

The cushion layer 8 is disposed over the bonding layer 60 and preferably comprises a paper-based cushion material, such as an expandable paper mesh 80, which can be formed of a packaging paper, such as kraft paper, paperboard, and/or rigid corrugated paperboard (also referred to as "cardboard" or "corrugate"), by way of non-limiting examples.

Referring now to FIGS. 1-4, the paper mesh 80 is expandable along the transverse direction T and along a direction perpendicular to the transverse direction T between an initial flat configuration 12 and various expanded configurations E. In the illustrated embodiment, the paper mesh 80 is also expandable along the longitudinal direction X, which can also cause the paper mesh 80 to contract slightly along the lateral direction Y. In other embodiments, the paper mesh 80 can be oriented so as to be expandable along the lateral direction Y and contractible along the longitudinal direction X.

Figure 3:
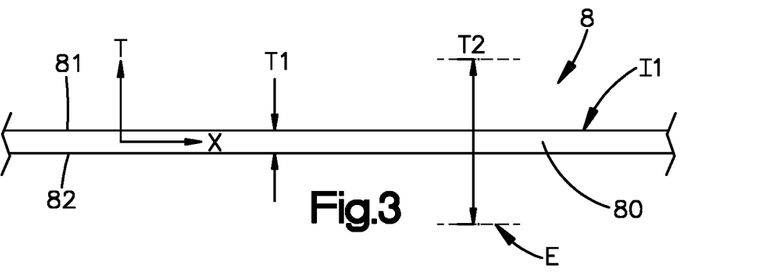
FIG. 3 shows a side elevation view of a portion of the cushion layer in an initial, flat configuration.
Figure 4:
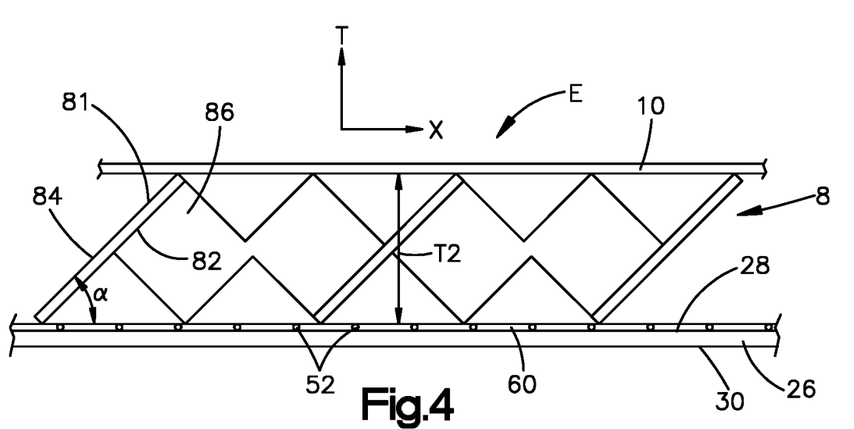
FIG. 4 shows a side elevation view of the portion of the cushion layer illustrated in FIG. 3 in an expanded configuration, according to an embodiment of the present disclosure.

The paper mesh 80, and thus the cushion layer 8, defines a plurality of a nodes 84 interconnected by a plurality of legs 86. When stretched, the paper mesh 80 defines a plurality of expanded cells 88 separated from one another by the pluralities of legs 86 and nodes 84. Within a central portion 90 of the cushion layer 8, a at least a majority of the legs 86 and nodes 84 extend at an oblique angle α with respect to the outer liner 6 and the inner liner 10. The angle α can be in a range between 1 degree to 89 degrees, more particularly within a range of about 30 degrees to about 60 degrees, and preferably in a range of about 40 degrees to about 50 degrees.

The nodes 84, legs 86, and cells 88 are preferably defined by a plurality of perforations cut through the paper of the cushion layer 8 in a manner forming the paper mesh 80. The perforations are preferably formed according to a uniform pattern so as to allow uniform expansion of the cells 88 when sufficient tension is applied to the paper mesh 80, such as along the longitudinal direction X. It is to be appreciated that the paper mesh 80 can be configured as described in U.S. patent application Ser. No. 15/720,538, filed Sep. 29, 2017, in the name of Hoffman et al. (the "Hoffman reference"); and Ser. No. 15/861,600, filed Feb. 8, 2018, in the name of Talda et al. (the "Talda reference"), the entire disclosure of each of which is incorporated by reference herein. Accordingly, the cells 88 can each be hexagonal, as in the present embodiment, providing the paper mesh 80 with a honeycomb-like structure in the expanded configurations E. It is to be appreciated, however, the other perforation patterns and expanded cell structures are within the scope of the present disclosure.

The paper mesh 80 defines a first or top mesh surface 81, a second or bottom mesh surface 82, and a thickness measured between the top and bottom surfaces 81, 82 along the transverse direction T. In the initial configuration 12, the paper mesh 80 defines an initial thickness T1. In any of the expanded configurations E, the paper mesh 80 defines an expanded thickness T2 that is greater than the initial thickness T1. With reference to FIG. 4, as the mesh 80 transitions to an expanded configuration E, the top and bottom surfaces 81, 82 of the nodes 84 individually rotate to an expanded orientation at an oblique angle α with respect to the direction in which the tension is applied, which is the longitudinal direction X in the illustrated embodiments. Preferably, the paper mesh 80 is preconditioned, such as in the manner described in the Talda reference, so that all of the nodes 84 rotate in the same direction so that all of the nodes 84 are substantially parallel with each other in the expanded configuration E. This result provides uniform expansion of the mesh 80 into the honeycomb structure.

It is to be appreciated that the cushion layer 8 can employ other types of paper cushioning, such as crinkled paper, for example, and can alternatively include materials other than paper-based materials. By way of non-limiting example, the cushion layer 8 can include an expandable adhesive that can be printed onto one or both of the outer and inner liners 6, 10 in an unexpanded configuration and can be subsequently expanded into a cushioning configuration responsive to an activation energy source, such as thermal energy, microwaves, or other types of energy sources.

Referring again to FIG. 1, the inner liner 10 is disposed over the cushion layer 8, and thus also over bonding layer 60. The inner liner 10 is also a sheet of packaging paper, preferably kraft paper, although other types of packaging paper are also within the scope of the present disclosure. The inner liner 10 is preferably bonded to the outer liner 6 via one or more activated regions of the bonding layer 60. For example, a first activated region 61 of the bonding layer 60 can bond both of the cushion layer 8 and the inner liner 10 to the inner surface 28 of the sheet 26. The first activated region 61 can extend along a periphery of the inner liner 10 and a periphery of the cushion layer 8. Thus, the first activated region 61 can adhere a peripheral portion 89 of the cushion layer 8 and a peripheral portion 11 of the inner liner 10 to the first surface 28 of the sheet 26. It is to be appreciated that any nodes 84 and legs 88 of the paper mesh 80 within the bonded, peripheral portion 89 of the cushion layer 8 are preferably substantially flattened. The central portion 90 of the cushion layer 8 is located inward of the peripheral portion 89 of the cushion layer 8. In addition to the first activated region 61, the bonding layer 60 within the first and second peripheral portions 32, 34 and within the closure flap 13 is also configured to be activated into an adhesive. It is to be appreciated that the bonding layer 60 of the present embodiment allows the laminate 4 to be formed with a single adhesive (i.e., the bonding layer 60) and without any secondary adhesives. The use of a single adhesive can provide significant savings in both the weight of the laminate 4 and the cost of forming the laminate 4.

Figure 5:
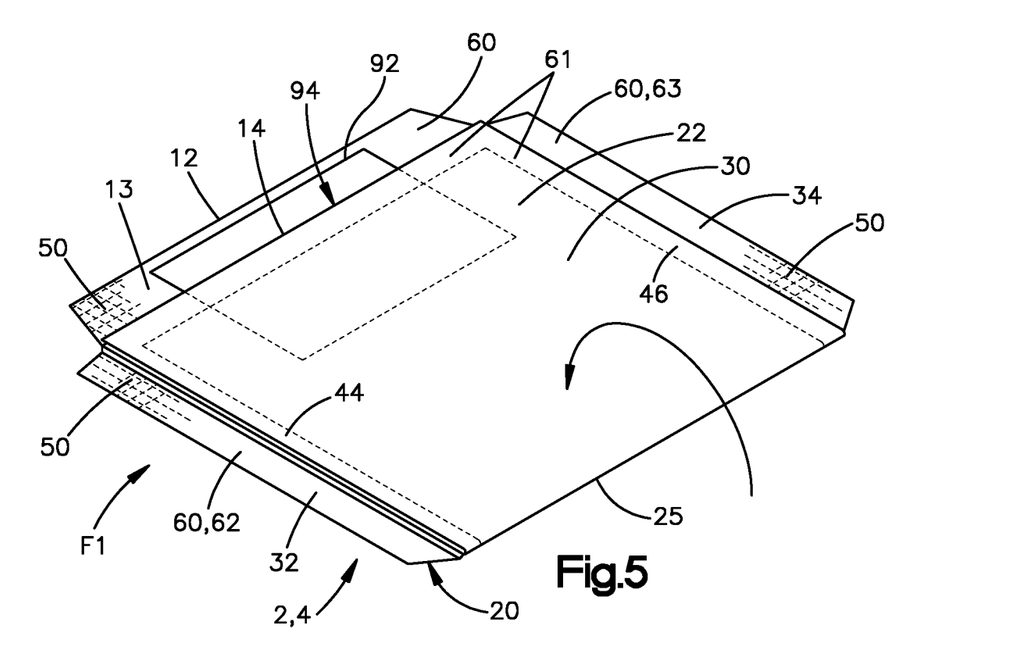
FIG. 5 shows a perspective view of the laminate illustrated in FIG. 1 folded into a first folded configuration, according to an embodiment of the present disclosure.

A method of preparing a padded package 2 according to an example embodiment of the present disclosure will now be described with reference to FIGS. 5 and 6. The method includes folding one or both of the first laminate portion 20 and the second laminate portion 22 with respect to the other, such as about boundary 24, so that the inner liner 10 defines an interior volume of the package 2 and the outer surface 30 of the sheet 26 of paper of the outer liner 6 defines an exterior of the package 2. It is to be appreciated that the second laminate portion 22 can be folded with respect to the first laminate portion 20 so as to be substantially doubled over the first laminate portion 20, as shown in FIG. 5. Alternatively, the first laminate portion 20 can be folded over the second laminate portion 22 so as to be doubled over the second laminate portion 20. Alternatively, the first and second laminate portions 20 can each be folded with respect to the other so that they are doubled over one another.

Figure 6:
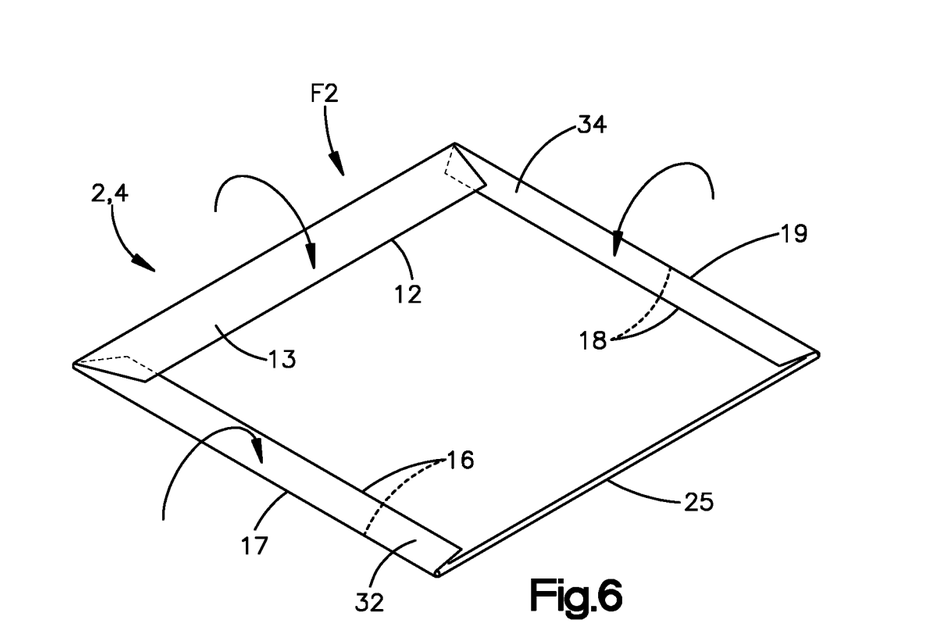
FIG. 6 shows a perspective view of the laminate illustrated in FIG. 5 folded into a FIG. 6 shows a perspective view of the laminate illustrated in FIG. 5 folded into a second folded configuration, according to an embodiment of the present disclosure.

Referring now to FIG. 6, the method includes folding the lateral edges 16, 18 of the first laminate portion 20 over the lateral edges 16, 18 of the second laminate portion 22, such as by folding the first and second peripheral portions 32, 34 over the third and fourth peripheral portions 44, 46, respectively, thereby contacting the bonding layer 60 of portions 32, 34 to the outer surface 30 of the sheet 26 along the second laminate portion 22. Portions of the bonding layer 60 (such as those within the first and second peripheral portions 32, 34) in contact with the outer surface 30 can be activated into an adhesive, thereby bonding the first and second peripheral portions 32, 34 to the outer surface 30 over the third and fourth peripheral portions 44, 46. Thus, a second activated region 62 of the bonding layer 60 adheres the first and third peripheral portions 32, 44 together and a third activated region 63 of the bonding layer 60 adheres the second and fourth peripheral portions 34, 46 together, thereby sealing the lateral edges 17, 19 of the package 2. With the lateral edges 17, 19 sealed, one or more items 92 can be inducted into the interior volume of the package 2 through an induction opening 94 defined between adjacent induction ends of the first and second laminate portions 20, 22. It is to be appreciated that such induction ends can be defined by the first and second ends 12, 14 of the laminate 4. With the one or more items 92 inducted into the interior volume, the flap 13 can be folded over the other induction end 14 so as to contact the bonding layer 60 of the flap 13 to the exterior surface 30 of the second laminate portion 22, thereby closing the induction opening 94. The bonding layer 60 of the flap 13 can be activated into an adhesive, thereby sealing the induction opening 94 of the package 2, with the filament mesh 50 spanning the seam formed along the closed induction opening 94.

Figure 7:
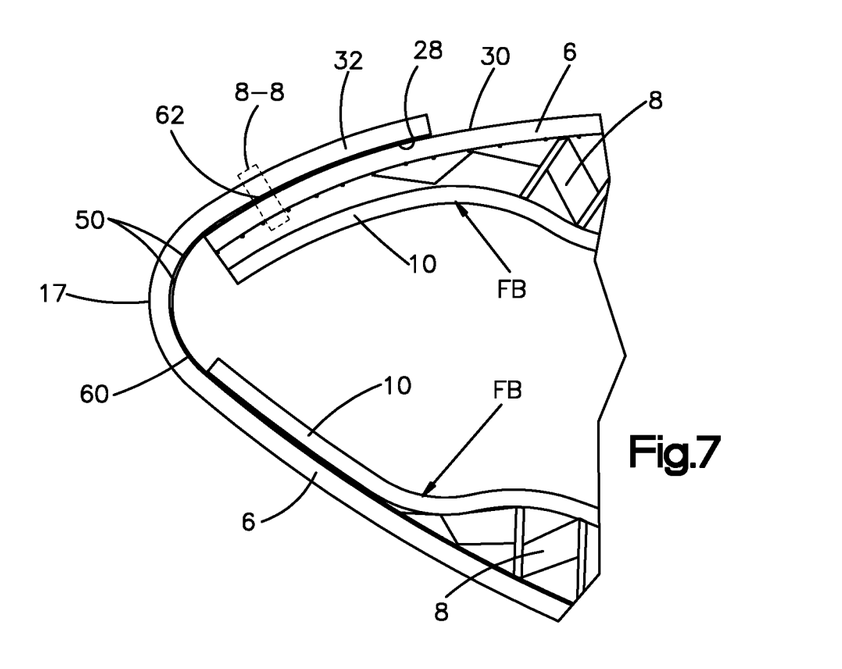
FIG. 7 shows an enlarged view of a sealed seam of the package illustrated in FIG. 6.
Figure 8:
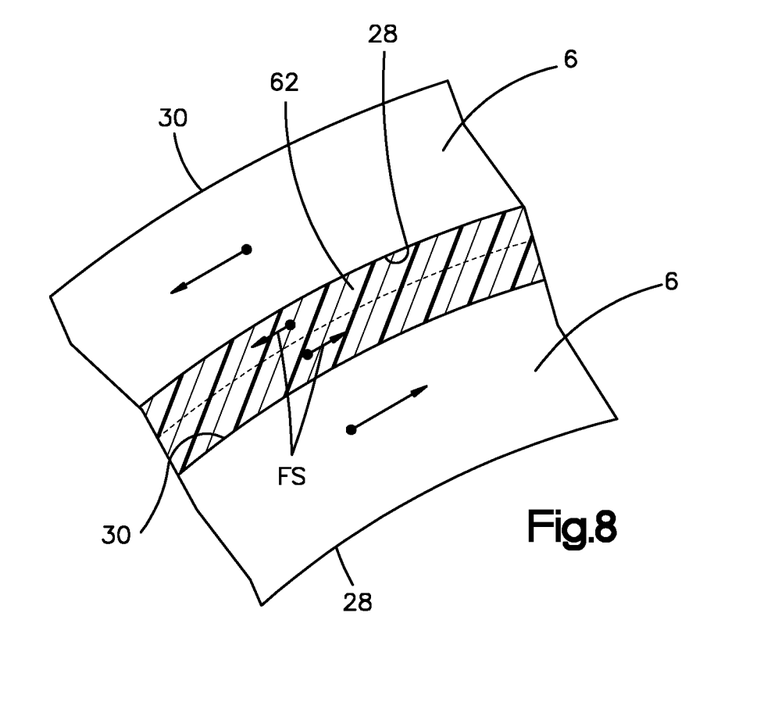
FIG. 8 shows an enlarged view of a bond of the sealed seam illustrated in FIG. 7.

Referring now to FIGS. 7 and 8, the construction of the package 2 according to the embodiments disclosed herein provides significant benefits to the package seals, particularly be increasing the strength of the seals, which can prevent or at least reduce the likelihood of the contents of the package 2 "bursting" the seams at the edges of the package 2. One way in which the seams are strengthened is by the presence of the fold-over portions 32, 34, 13, whereby the sheet 26, which is reinforced by the filament mesh 50, absorbs the bursting loads, which avoids peeling modes of stress on the heat seals. Additionally, the presence of the fold-over portions 32, 34, 13 and the location of the heat seals 62, 63 causes bursting loads FB to be channeled or otherwise redirected predominantly into modes of shear stress FS on the heat seals 62, 63. The heat seals 62, 63 are significantly stronger under shear stress FS, whereby the loading is absorbed substantially by the entire bond, than under peeling stress, whereby the loading is absorbed by only a small portion of the bond, which is more likely to fail, thus leading to a progressive, cascading failure of adjacent regions of the bond. Further, in embodiments where the sheet 26 comprises extensible kraft paper, the stretch of the sheet 26 also reduces the stress imparted to the heat seals 62, 63.

Figure 9:
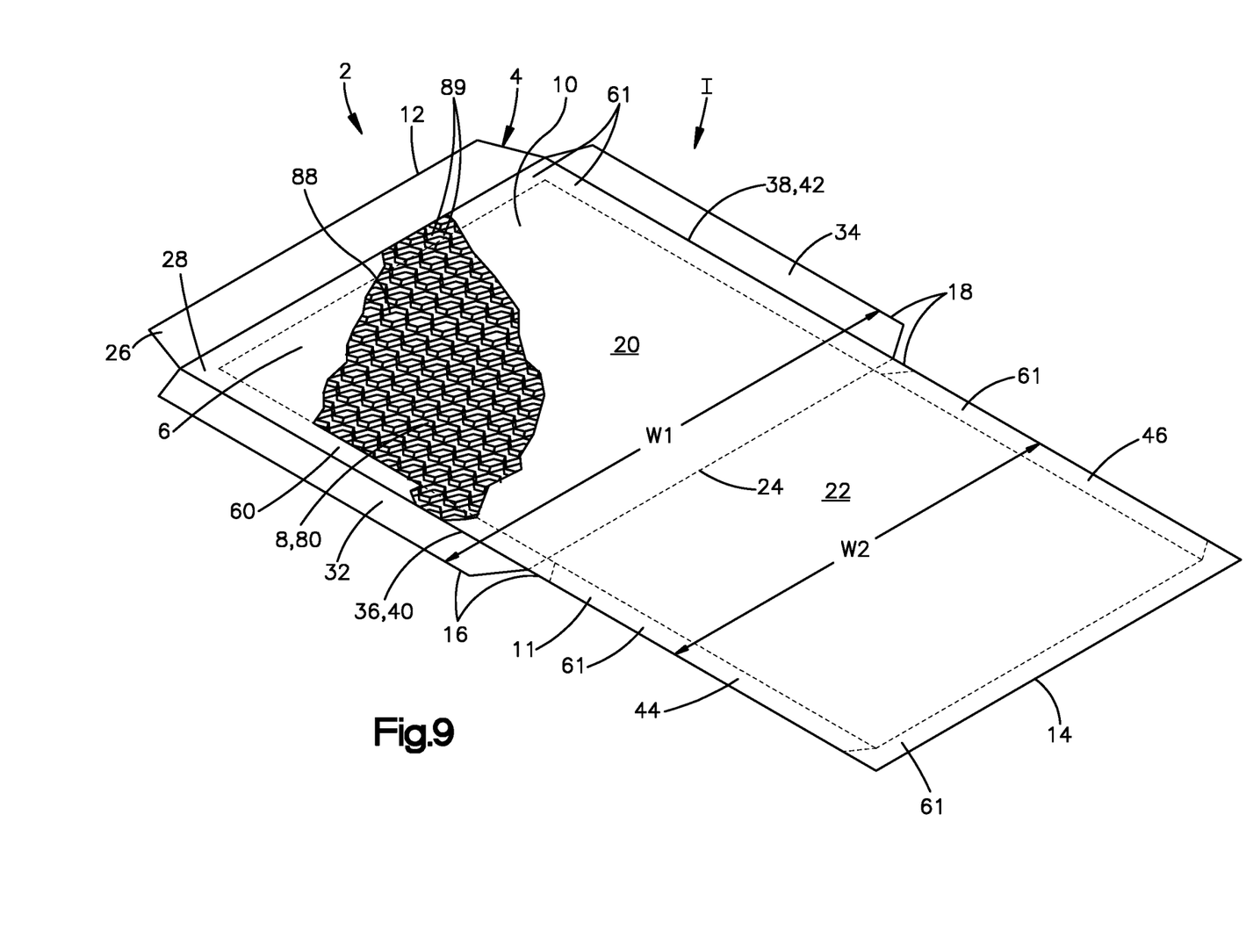
FIG. 9 shows a perspective view of a packaging laminate according to an additional embodiment of the present disclosure.

Referring now to FIG. 9, additional embodiments of a package 102 can include a cushioned laminate 104 that is similar to the laminate 4 described above, with a primary difference, and optionally the only difference, being the absence of the filament mesh 50. Stated differently, the laminate 4 described above can be employed without the filament mesh 50. It is to be appreciated that any of the same multi-purpose layers 60 of material described above, including those that provide a moisture barrier and at least one mode of adhesion, and preferably also a second mode of adhesion, can be employed in the present embodiment illustrated in FIG. 9. As described above, the layer 60 can be disposed on the inner surface 28 of the sheet 26, such as by one or more of a a laminating process and an extrusion-coating process, by way of non-limiting examples. Moreover, as described above, the layer 60 is preferably a type that is configured to be activated into an adhesive that bonds with the inner liner 10 (thus bonding the cushion layer 8 and the inner liner 10 to the sheet 26) when exposed to a catalyst, such as those catalysts described above. It is to be appreciated that the laminate 104 can be folded into the package 102 in the manner described above with reference to FIGS. 5 and 6. It is also to be appreciated that the lateral edges of the package 102 can be sealed in the manner described above with reference to FIGS. 6 through 8.

As described above, the seams of the package 102 formed from the laminate 104 are strengthened by the presence of the fold-over portions 32, 34, 13, whereby the sheet 26 absorbs the bursting loads, which avoids peeling modes of stress on the heat seals. Additionally, the presence of the fold-over portions 32, 34, 13 and the location of the heat seals 62, 63 causes bursting loads FB to be channeled or otherwise redirected predominantly into modes of shear stress FS on the heat seals 62, 63, significantly strengthening the heat seals, as described above. Thus, although the package 102 formed from the laminate 104 of the present embodiment lacks the additional structural support of the filament mesh 50, the package 102 retains the other structural benefits, and can also benefit from a reduced weight relative to the embodiments that include the filament mesh 50.

It is to be appreciated that, in yet other embodiments, at least a portion but less than an entirety of the inner surface 28 of the sheet 26 can include a filament mesh 50 bonded thereto.

It is also to be appreciated that the cushioned laminates 4, 104 described herein can also be employed in sizes greater than standard-sized mailers, and can also be modified within the scope of the present disclosure to form package types other than mailers. Furthermore, the cushioned laminates 4, 104 can also be modified for use in a wide variety of uses other than packaging.

It should be noted that the illustrations and descriptions of the embodiments shown in the figures are for exemplary purposes only, and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should further be appreciated that the various alternative embodiments described above with respect to one illustrated embodiment can apply to all embodiments as described herein, unless otherwise indicated. Also, the present invention is not intended to be limited by any description of drawbacks or problems with any prior art device.

Unless explicitly stated otherwise, each numerical value and range should be interpreted as being approximate as if the word "about" or "approximately" preceded the value or range.

It should be understood that the steps of exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

What is claimed is:

1. A package, comprising:
    an outer liner including a sheet of paper having opposed inner and outer surfaces, wherein a resin layer is coated over an entirely of the inner surface in a manner bonding the resin layer to the inner surface, and the resin layer defines a moisture barrier;
    a cushion layer disposed over the resin layer; and
    an inner liner formed of kraft paper and disposed over the cushion layer, wherein a first activated region of the resin layer adheres the cushion layer and the inner liner to the inner surface such that the outer liner, the cushion layer, and the inner liner collectively define a laminate, the laminate having a first laminate portion longitudinally spaced from a second laminate portion,
    wherein:
        the outer liner in the first laminate portion has opposed first and second peripheral portions that extend laterally beyond the cushion layer and the inner liner,
        at the second laminate portion, the outer liner defines laterally opposed third and fourth peripheral portions,
        the laminate is folded such that the first laminate portion is doubled over the second laminate portion so that the inner liner defines an interior of the package and the outer surface of the outer liner defines an exterior of the package,
        the first and second peripheral portions are respectively folded over the third and fourth peripheral portions such that the resin layer of the first and second peripheral portions contacts the outer surface of the second laminate portion, and
        a second activated region of the resin layer adheres the first and third peripheral portions together and a third activated region of the resin layer adheres the second and fourth peripheral portions together so as to define sealed lateral edges of the package.

2. The package of claim 1, wherein the first activated region of the resin layer adheres 1) a peripheral portion of the cushion layer to the inner surface, and 2) a peripheral portion of the inner liner to the inner surface.

3. The package of claim 1, wherein an entirely of the resin layer is bonded to an entirety of the inner surface.

4. The package of claim 1, wherein the folded first and second peripheral portions 1) provide that the sheet of paper is folded over the sealed lateral edges of the package so as to absorb outward forces from the interior of the package, and 2) redirect the outward forces into shear stresses at the second and third activated regions.

5. The package of claim 1, wherein the resin layer comprises a mineral-polyolefin blended resin.

6. The package of claim 1, wherein the resin layer is configured such that the activated regions are activated into an adhesive when exposed to a catalyst, wherein the catalyst comprises one or more of thermal radiation, electromagnetic radiation, pressure, friction, and vibration.

7. A cushioned laminate, comprising:
    an outer liner including a resin layer coated over a sheet of paper, wherein the coated resin layer extends from a first lateral edge of the sheet to an opposed second lateral edge of the sheet, and the coated resin layer defines a moisture barrier;
    a cushion layer disposed over the coated resin layer; and
    an inner liner formed of kraft paper and disposed over the cushion layer, wherein a region of the coated resin layer is activated into an adhesive bonding the cushion layer and the inner liner to the sheet,
    wherein the cushioned laminate defines a first portion longitudinally adjacent a second portion, the outer liner in the first portion has opposed first and second peripheral portions that extend laterally outward from opposed lateral edges of each of the cushion layer and the inner liner to the first and second lateral edges of the sheet, and a first width measured between the first and second lateral edges along the first portion is greater than a second width measured between the first and second lateral edges along the second portion.

8. The cushioned laminate of claim 7, wherein the coated resin layer at least within the first and second peripheral portions is also configured to be activated into an adhesive.

9. The cushioned laminate of claim 8, wherein the entire coated resin layer is configured such that additional select portions of the coated resin layer and up to an entirety of the coated resin layer can be activated into an adhesive when exposed to a catalyst.

10. The cushioned laminate of claim 7, wherein the coated resin layer comprises a mineral-polyolefin blended resin.

11. The cushioned laminate of claim 10, wherein the mineral-polyolefin blended resin comprises about 40 percent calcium carbonate and about 60 percent polyolefin.

12. The cushioned laminate of claim 11, wherein the polyolefin is selected from the group consisting of polypropylene, low density polyethylene, or a blend of low density polyethylene and high density polyethylene.

13. The cushioned laminate of claim 7, wherein the adhesive is a single adhesive, and the cushioned laminate is formed without any secondary adhesive.

14. The cushioned laminate of claim 7, wherein the cushion layer comprises paper and defines a plurality of a legs interconnecting a plurality of nodes, wherein the cushion layer is stretched so as to define a plurality of expanded cells separated from one another by the pluralities of legs and nodes, wherein at least a majority of the legs and nodes of a central portion of the cushion layer extend at an oblique angle with respect to the outer liner.

15. The cushioned laminate of claim 14, wherein the expanded cells are hexagonal, and the oblique angle is between 30 degrees and 60 degrees.

16. A method of preparing a package, comprising:
    folding one or both of a first portion of a laminate and a second portion of the laminate with respect to the other so that an inner liner of the laminate defines an interior volume of the package and an outer surface of a paper sheet of an outer liner of the laminate defines an exterior of the package, wherein the outer liner includes a resin layer coated over an inner surface of the sheet in a manner providing a moisture barrier over the inner surface, and the laminate includes a cushion layer disposed between the resin layer and the inner liner;

folding lateral edges of the first portion of the laminate over lateral edges of the second portion of the laminate, thereby contacting the resin layer to the outer surface along the second portion of the laminate; and activating the resin layer in contact with the outer surface along the second portion of the laminate into an adhesive, thereby sealing lateral edges of the package such that the sheet spans the lateral edges.

17. The method of claim 16, further comprising, prior to the first folding step, activating a portion of the resin layer into an adhesive along a peripheral region of each of the cushion layer and the inner liner, thereby bonding the cushion layer and the inner liner to the outer liner.

18. The method of claim 16, further comprising inducting one or more items into the interior volume of the package through an induction opening defined between adjacent induction ends of the first and second portions of the laminate.

19. The method of claim 18, further comprising folding a flap of the outer liner extending from the induction end of one of the first and second portions over the induction end of the other of the first and second portions, thereby contacting the resin layer of the flap to an exterior surface of the other of the first and second portions and closing the induction opening.

20. The method of claim 19, further comprising activating the resin layer of the flap into an adhesive, thereby sealing the induction opening of the package.

\* \* \* \* \*